United States Patent
Semba et al.

(10) Patent No.: US 10,867,153 B2
(45) Date of Patent: Dec. 15, 2020

(54) IMAGE PROCESSING APPARATUS AND IMAGE PROCESSING METHOD

(71) Applicant: FUJITSU LIMITED, Kawasaki (JP)

(72) Inventors: Satoshi Semba, Kawasaki (JP); Yukihiro Abiko, Kawasaki (JP); Soichi Hama, Atsugi (JP); Satoshi Maeda, Atsugi (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 16/135,058

(22) Filed: Sep. 19, 2018

(65) Prior Publication Data

US 2019/0095675 A1 Mar. 28, 2019

(30) Foreign Application Priority Data

Sep. 22, 2017 (JP) ................. 2017-182189

(51) Int. Cl.
*G06K 9/00* (2006.01)
*G06K 9/32* (2006.01)
*G06F 21/32* (2013.01)
*G06F 1/16* (2006.01)
*G06F 3/03* (2006.01)

(52) U.S. Cl.
CPC ......... *G06K 9/0004* (2013.01); *G06F 1/1686* (2013.01); *G06F 3/0304* (2013.01); *G06F 21/32* (2013.01); *G06K 9/00013* (2013.01); *G06K 9/00033* (2013.01); *G06K 9/00234* (2013.01); *G06K 9/00382* (2013.01); *G06K 9/00912* (2013.01); *G06K 9/3275* (2013.01)

(58) Field of Classification Search
CPC .. G06K 9/00; G06K 9/00221; G06K 9/00979; G06K 9/0004; G06K 9/00013; G06K 9/00033; G06K 9/00234; G06K 9/00382; G06K 9/00912; G06K 9/3275; G06F 21/32; G06F 1/1686; G06F 3/0304
USPC .......................................... 328/115, 118, 124
See application file for complete search history.

(56) References Cited

U.S. PATENT DOCUMENTS

| 6,813,377 | B1 | 11/2004 | Gopalakrishnan et al. |
| 8,320,998 | B2 * | 11/2012 | Sato ..................... A61B 5/0059 600/474 |
| 2008/0101664 | A1 | 5/2008 | Perez |

(Continued)

FOREIGN PATENT DOCUMENTS

| CN | 107133557 | 9/2017 |
| JP | 2005-115548 | 4/2005 |
| JP | 2015-072155 | 4/2015 |

OTHER PUBLICATIONS

EESR—Extended European Search Report dated Feb. 26, 2019 for corresponding European Patent Application No. 18194752.4.

(Continued)

*Primary Examiner* — Duy M Dang
(74) *Attorney, Agent, or Firm* — Fujitsu Patent Center

(57) ABSTRACT

An image processing apparatus includes a memory and a processor configured to acquire an image in which a subject is captured by a camera, calculate a plurality of spatial frequency characteristics on the basis of each of a plurality of regions included in the image, and perform determination of a tilt of the subject with respect to the camera in accordance with the plurality of spatial frequency characteristics.

13 Claims, 14 Drawing Sheets

(56) References Cited

U.S. PATENT DOCUMENTS

| | | | |
|---|---|---|---|
| 2010/0292578 A1* | 11/2010 | Sato | G06K 9/00013 |
| | | | 600/473 |
| 2012/0154577 A1 | 6/2012 | Yoshikawa | |
| 2012/0230551 A1* | 9/2012 | Hama | G06K 9/036 |
| | | | 382/115 |
| 2013/0308834 A1 | 11/2013 | Suzuki et al. | |
| 2014/0020090 A1* | 1/2014 | Nada | G06F 21/32 |
| | | | 726/19 |
| 2015/0092091 A1 | 4/2015 | Ishihara | |
| 2015/0269406 A1 | 9/2015 | Hama et al. | |
| 2015/0350497 A1 | 12/2015 | Gamadia et al. | |
| 2016/0061594 A1 | 3/2016 | Kim et al. | |

OTHER PUBLICATIONS

EPOA—Office Action of European Patent Application No. 18194752.4 dated Oct. 13, 2020.

* cited by examiner

FIG. 9
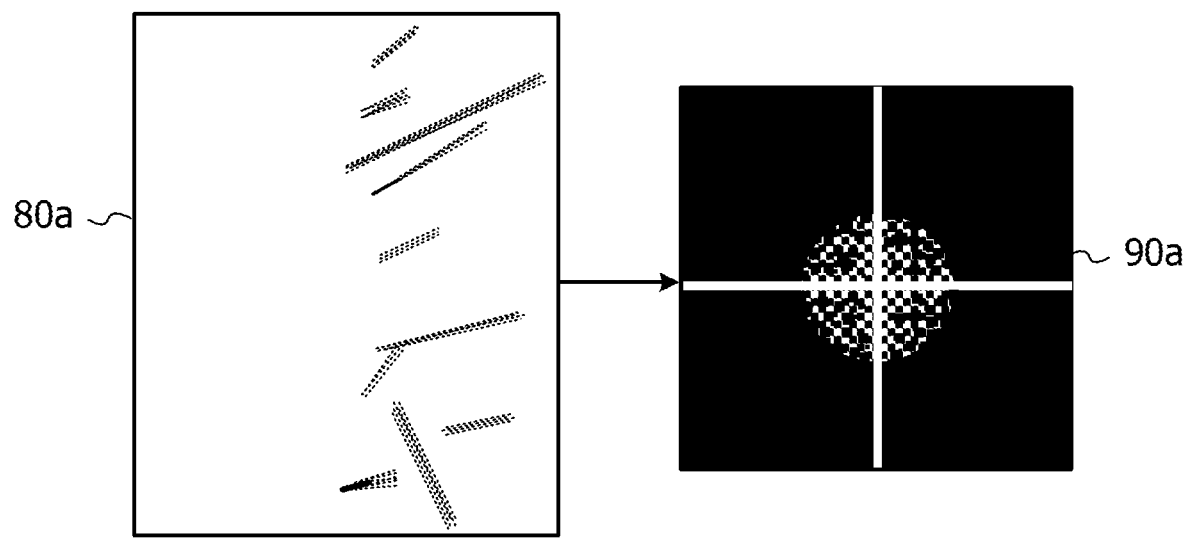
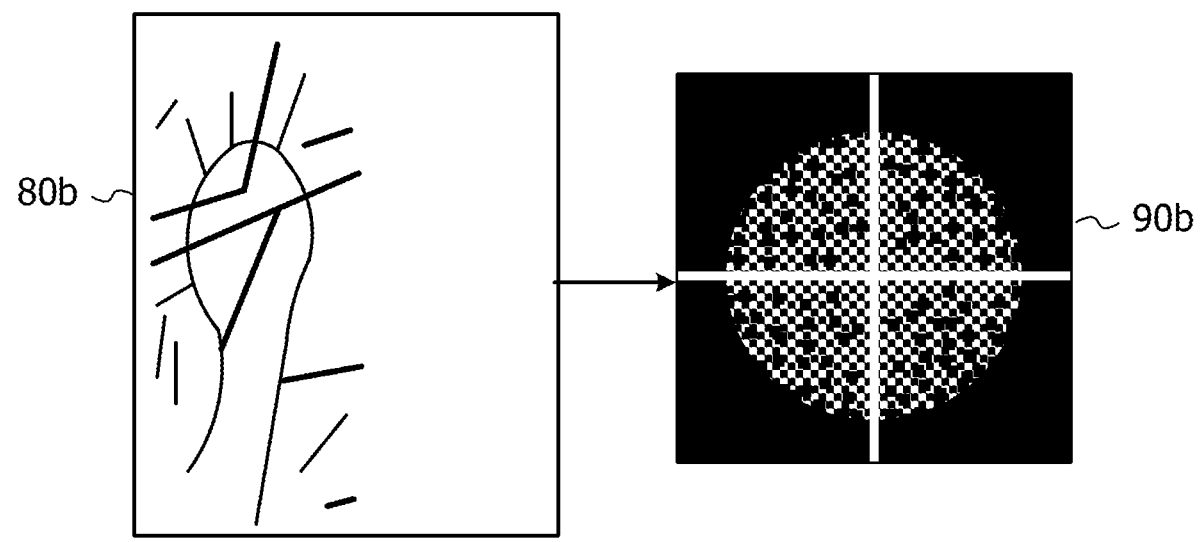

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2017-182189, filed on Sep. 22, 2017, the entire contents of which are incorporated herein by reference.

FIELD

The embodiments discussed herein are related to an image processing technique.

BACKGROUND

In a biometric authentication technique, in the case of acquiring a biological image in a contactless manner by using a sensor equipped with a camera, it is desirable to properly keep the posture of the subject and the distance between the subject and the sensor at the time of imaging. For this reason, a physical guide to correct the posture of the subject and the distance between the subject and the camera is often used. However, in a situation in which biometric authentication is implemented by a portable terminal or the like, the use of the physical guide impairs the portability. Therefore, it is desired to guide the subject and the camera to the proper distance without using the physical guide.

There is a technique in which distance information of a subject is calculated from difference in the manner of blur among plural images. For example, related arts are disclosed in Japanese Laid-open Patent Publication No. 2015-072155 and Japanese Laid-open Patent Publication No. 2005-115548.

SUMMARY

According to one viewpoint of the present disclosure, an image processing apparatus includes a memory and a processor configured to acquire an image in which a subject is captured by a camera, calculate a plurality of spatial frequency characteristics on the basis of each of a plurality of regions included in the image, and perform determination of a tilt of the subject with respect to the camera in accordance with the plurality of spatial frequency characteristics.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating one example of a result of a fast Fourier transform.

DESCRIPTION OF EMBODIMENTS

In conventional technology, even when the distance between the subject and the camera may be calculated, it is difficult to detect the posture of the subject. Here, it is also possible to rephrase the posture of the subject into the tilt of the subject with respect to the camera. For example, in palm authentication, it is preferable that a palm as the subject be imaged with a posture that is as parallel to the camera as possible.

The respective embodiments will be described in detail below with reference to the drawings. The respective kinds of processing in the respective embodiments may be combined as appropriate. In all drawings for explaining the respective embodiments, the same part is given the same numeral as in principle and repeated description thereof is omitted.

Figure 1:
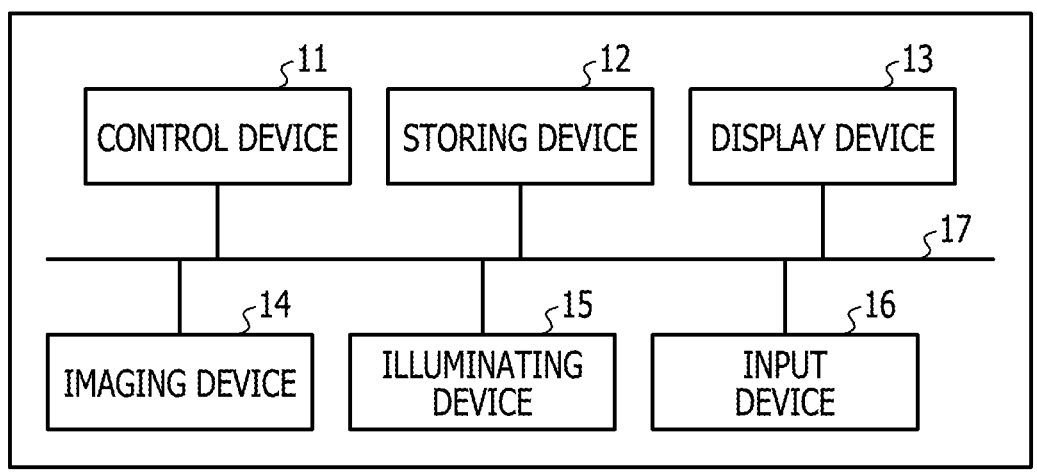
FIG. 1 is a diagram illustrating a hardware configuration example of an image processing apparatus.

FIG. 1 is a diagram illustrating a hardware configuration example of an image processing apparatus 10 of the respective embodiments. The image processing apparatus 10 of the respective embodiments includes a control device 11, a storing device 12, a display device 13, an imaging device 14, an illuminating device 15, and an input device 16, and these apparatuses are mutually coupled by a system bus 17.

The control device 11 is an apparatus that controls the image processing apparatus 10. For the control device 11, an electronic circuit such as a central processing unit (CPU) or a micro processing unit (MPU) may be used. The control device 11 controls operation of the image processing apparatus 10, such as various kinds of arithmetic operation and data input/output with various hardware configuring parts, and executes various kinds of processing based on an operating system (OS) and various kinds of programs stored in the storing device 12. The control device 11 may acquire various kinds of information and so forth used in execution of a program from the storing device 12, for example. Part of processing executed by the control device 11 may be implemented by using dedicated hardware. The control device 11 executes processing relating to the respective embodiments based on an image processing program and an authentication processing program.

The storing device 12 stores the image processing program and the authentication processing program. The storing device 12 may include a main storing device and an auxiliary storing device. The main storing device temporarily stores at least part of the OS or an application program which the control device 11 is caused to execute, for example. Furthermore, the main storing device stores various kinds of data for processing by the control device 11. As the main storing device, read only memory (ROM), random access memory (RAM), and so forth may be used, for example.

The auxiliary storing device stores the image processing program and the authentication processing program, for example. The auxiliary storing device may carry out reading and writing of various kinds of information that are stored based on an instruction from the control device 11. As the auxiliary storing device, storages such as hard disk drive (HDD) and solid state drive (SSD) may be used. The auxiliary storing device may store information used in processing and a result of processing. Furthermore, the main storing device and the auxiliary storing device may assume each other's functions.

For the display device 13, a liquid crystal display, a touch panel, or the like may be used, for example. The display device 13 displays execution progress and execution result of the image processing program, the result of authentication processing, and so forth based on an instruction from the control device 11.

The imaging device 14 is imaging device that images biological information of a user based on an instruction from the control device 11 and takes an image including a palm of the user in a contactless manner in the respective embodiments. As the imaging device 14, a complementary metal oxide semiconductor (CMOS) camera or a charge coupled device (CCD) camera may be used, for example. Furthermore, the imaging device 14 does not have to be equipped with an infrared light cut filter.

The illuminating device 15 is an apparatus that illuminates a subject when the imaging device 14 carries out imaging. A light emitting diode (LED) light source may be used or the illuminating device 15 may be an infrared LED.

The input device 16 is an apparatus that accepts input from a user. For example, touch panel, keyboard, mouse, and so forth may be used.

Figure 2:
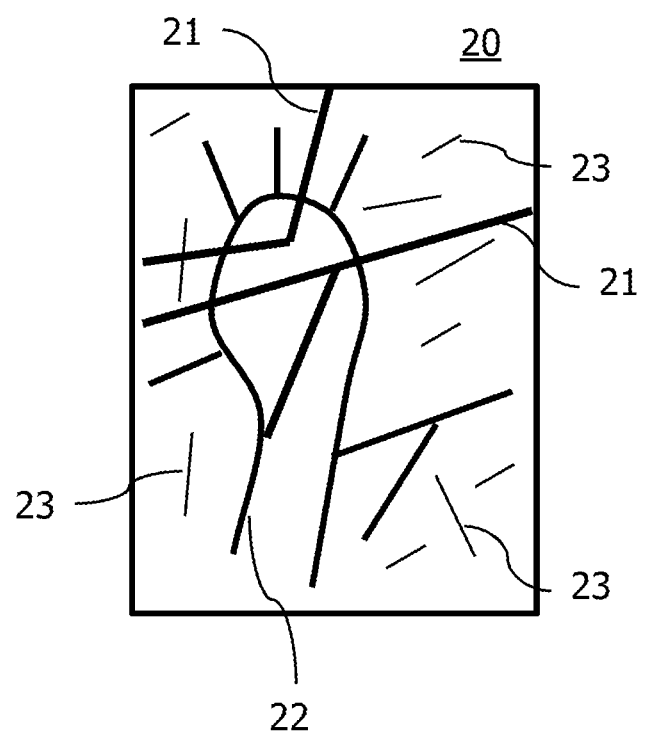
FIG. 2 is a diagram illustrating one example of an image including a biological body.

Concrete operation of image processing of the control device 11 of the image processing apparatus 10 according to a first embodiment will be exemplified below. The control device 11 acquires an image including a biological body imaged by the imaging device 14. FIG. 2 is a diagram illustrating one example of an image 20 including a biological body. As one example, the image 20 is an image obtained by imaging a palm of a user and a palm print 21 of the palm, a vein 22 passing inside the hand, and fine wrinkles 23 are captured. The palm print 21 is called palm lines and refers to large wrinkles existing on the palm. The fine wrinkles 23 refer to fine wrinkles similar to the fingerprint of a fingertip. In the image 20 of FIG. 2 and similar diagrams to be explained in the following, description of numerals is partly omitted.

The control device 11 turns an acquired color image monochrome (single color). For example, the control device 11 may generate a monochrome image based on only any element of the luminance values of RGB of each pixel of the color image. For example, the control device 11 may employ only the luminance value of R of each pixel of the acquired color image as the new luminance value of each pixel to generate the monochrome image.

The control device 11 divides the generated monochrome image into plural regions and calculates a characteristic of the spatial frequency regarding each of the plural regions. As an example of the dividing, the control device 11 may bisect the monochrome image into right and left images or may bisect the monochrome image into upper and lower images, for example.

Here, the spatial frequency is a nature in terms of a structure having a spatial cycle and represents the quantity of repetitions of a structure included in the unit length. In the two-dimensional image, the image may be regarded as superposition of two-dimensional waves having the depth of the color as the amplitude. Thus, for example, by obtaining the spatial frequency regarding the image 20 of a palm, it becomes possible to evaluate the complexity (fineness) of the pattern configured by the palm print 21, the vein 22, the fine wrinkles 23, and so forth of the palm included in the image 20.

Furthermore, the characteristic of the spatial frequency refers to a power spectrum relating to the two-dimensional spatial frequency. For example, the control device 11 may carry out a two-dimensional Fourier transform by using a discrete Fourier transform (DFT) or a fast Fourier transform (FFT) regarding each of plural regions arising from dividing to calculate the characteristic of the spatial frequency corresponding to each of the plural regions.

Figure 3:
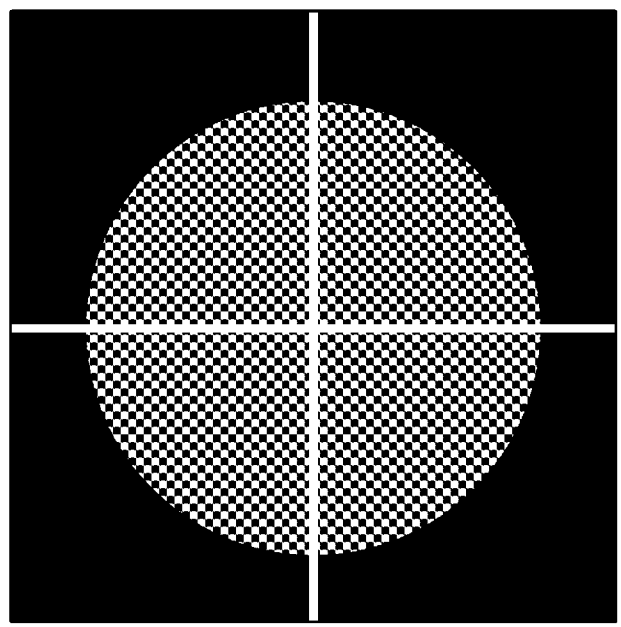
FIG. 3 is a diagram illustrating one example of a power spectrum image that represents a characteristic of a spatial frequency.

FIG. 3 is a diagram illustrating one example of a power spectrum image 30 that represents the characteristic of the spatial frequency. For example, the power spectrum image 30 is an image obtained by disposing a lower-frequency component at a position closer to the center and disposing a higher-frequency component at a position closer to the periphery and representing the amount of component by the luminance regarding a power spectrum relating to the spatial frequency calculated through a fast Fourier transform of a monochrome image of the image 20. The power spectrum image 30 represents the following characteristics. For example, the position at the same distance from the center represents the same frequency. When the color is closer to white, a larger amount of component of the frequency of the position is included. When the color is closer to black, the amount of component of the frequency of the position is smaller.

Therefore, in the power spectrum image 30 representing the result of the fast Fourier transform of the monochrome image of the image 20, the luminance of the central part is high when a large amount of low-frequency components is included in the image 20, and the luminance of the peripheral part is high when a large amount of high-frequency components is included.

Figure 4:
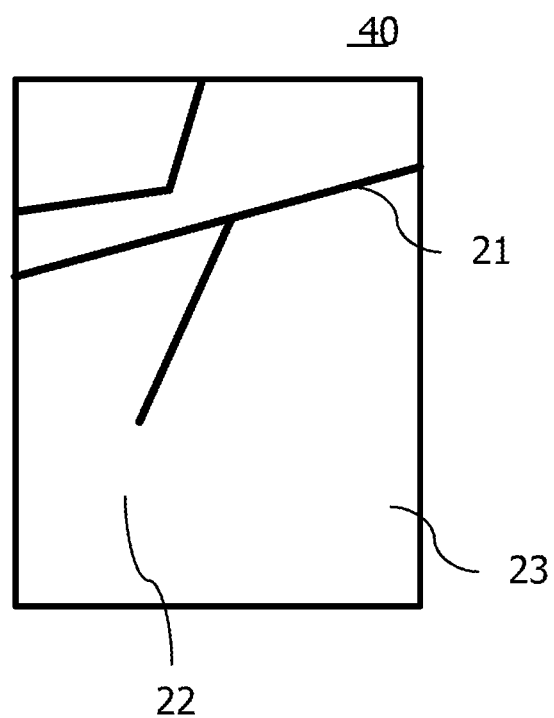
FIG. 4 is a diagram illustrating one example of an image including a biological body.

FIG. 4 is a diagram illustrating one example of an image 40 including a biological body. The image 40 is an image obtained by imaging a palm in the state in which the palm is located at a shorter distance from the imaging device 14 than the focal length of the imaging device 14. Because the palm is imaged in the state in which the palm is located at a shorter distance from the imaging device 14 than the focal length of the imaging device 14, the vein 22 and the fine wrinkles 23 blur and are hardly captured in the image 40 although the palm print 21 of the palm is captured.

Figure 5:
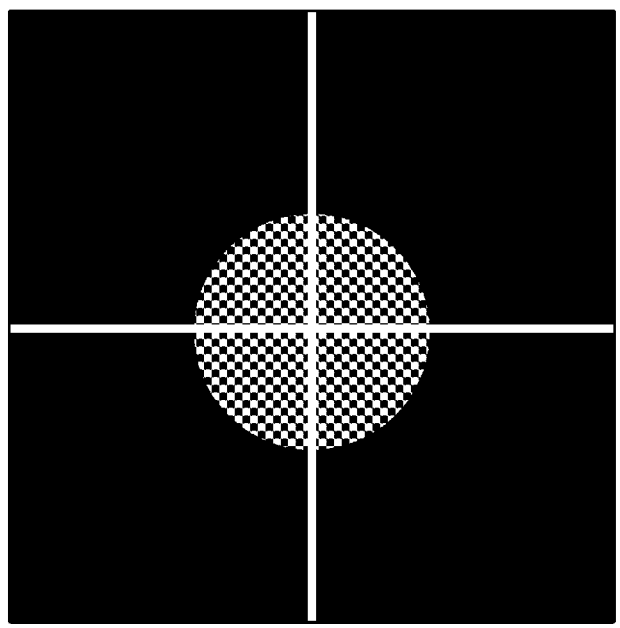
FIG. 5 is a diagram illustrating one example of a power spectrum image that represents a characteristic of a spatial frequency.

FIG. 5 is a diagram illustrating one example of a power spectrum image 50 that represents the characteristic of the spatial frequency. The power spectrum image 50 is a power spectrum image that represents the result of a fast Fourier transform of a monochrome image of the image 40. In the image 40, the amount of frequency components other than low-frequency components is small because the fine wrinkles 23 blur. Thus, for example if it is assumed that the image 20 is an image obtained by imaging a palm with appropriate posture and position, it turns out that the luminance is low at the part excluding the part comparatively close to the center in the power spectrum image 50 compared with the power spectrum image 30 corresponding to the image obtained by the imaging with the appropriate posture and position.

That the posture of a palm is appropriate means that the tilt of the palm with respect to the imaging device 14 is comparatively small, for example. Furthermore, that the position of a palm is appropriate means that the distance between the palm and the imaging device 14 comparatively corresponds with the focal length of the imaging device 14, for example. Therefore, the image obtained by imaging in the state in which the posture and position of the palm are appropriate has a certain level (level at which information for carrying out palm authentication may be sufficiently acquired) of clearness.

Furthermore, the control device 11 compares the calculated characteristics of the spatial frequency regarding plural regions. For example, the control device 11 compares the values of components of frequencies in a given range included in the characteristics of the spatial frequency regarding the plural regions. For example, the control device 11 calculates average A of the values of components of frequencies in the given range included in the characteristic of the spatial frequency corresponding to region A.

As the given range, a doughnut-shaped range obtained by excluding the part comparatively close to the center and the part comparatively remote from the center in the power spectrum image may be employed, for example. The given range may be a range equivalent to the region from the position separate from the center by 50 pixels to the position separate from the center by 100 pixels, for example. The given range is not limited to the exemplified range. The width of the range may be decreased and the given range may be a range inside the position separate from the center by 50 pixels or a range outside the position separate from the center by 100 pixels. The given range may be set based on the number of pixels of the original image regarding which a fast Fourier transform is carried out. Furthermore, it is also possible to employ, as the given range, a range obtained by simply excluding the part comparatively close to the center in the power spectrum image (as one example, range outside the hatched circle in FIG. 5), for example.

Similarly, the control device 11 calculates average B of the values of components of frequencies in the given range included in the characteristic of the spatial frequency corresponding to region B. Then, the control device 11 compares calculated average A and average B. The control device 11 may calculate the difference between average A and average B.

The control device 11 determines the posture of the biological body (hand) imaged into the image 20 with respect to the imaging device 14 according to the result of the comparison. For example, if average A is smaller than average B and the difference between average A and average B is equal to or larger than a threshold, the control device 11 may determine that the part of the palm corresponding to region A is closer to the imaging device 14 than the part of the palm corresponds to region B. In the case in which the user is carrying out the imaging while stretching an arm and orienting a palm downward, for example, if it is assumed that region A is the right side of the image and region B is the left side of the image, the control device 11 may determine that the left side of the palm is closer to the imaging device 14 than the right side. In this case, the control device 11 may determine that the palm is tilted leftward with respect to the imaging device 14.

Furthermore, for example, if the difference between average A and average B is smaller than the threshold, the control device 11 may determine that the part of the palm corresponding to region A and the part of the palm corresponding to region B exist at almost the same distance from the imaging device 14 and the palm is horizontal with respect to the imaging device 14.

Figure 6:
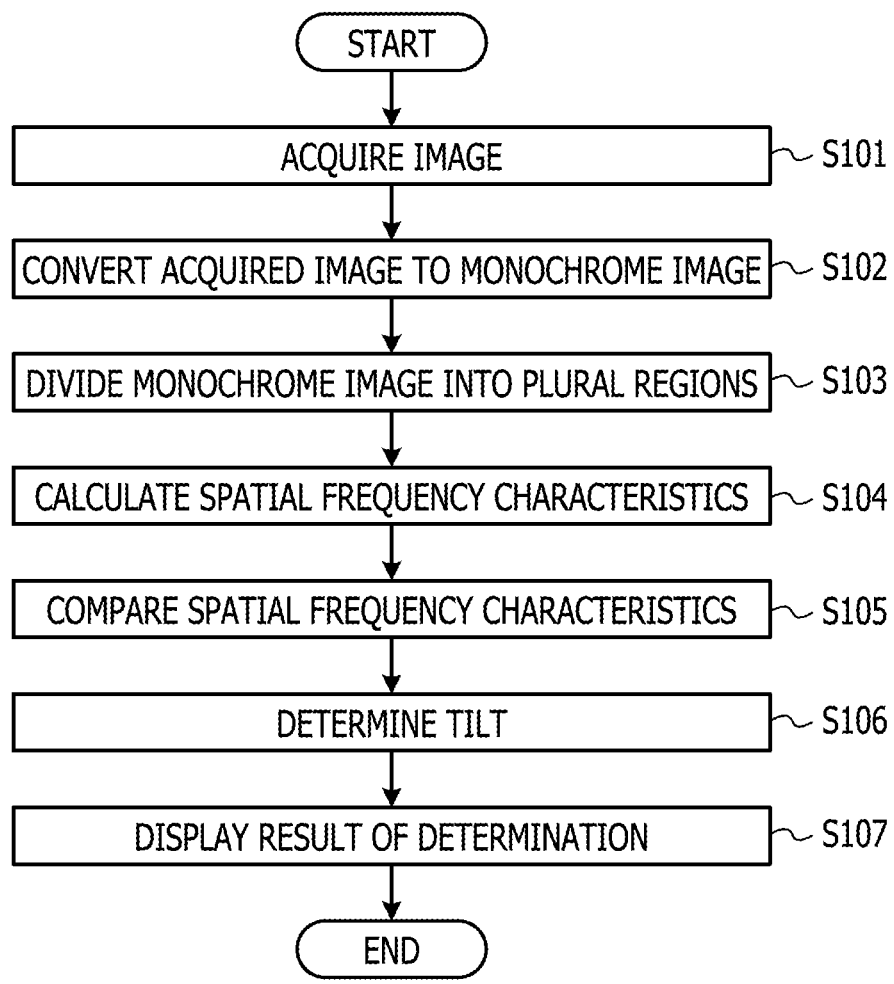
FIG. 6 is a flowchart illustrating one example of image processing procedure.
Figure 7:
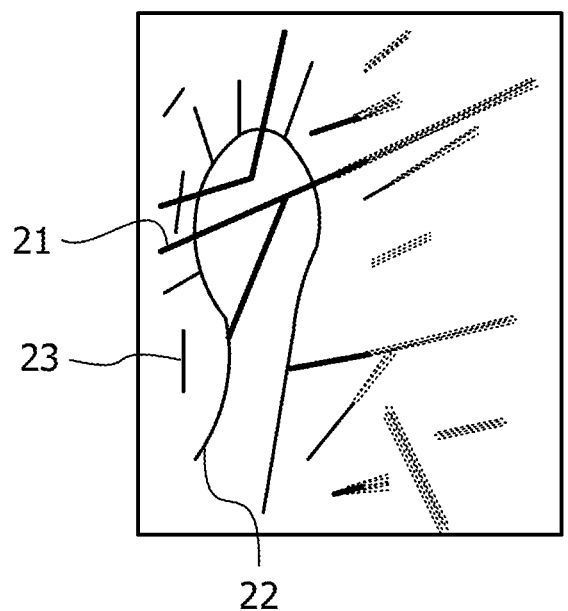
FIG. 7 is a diagram illustrating one example of an image including a biological body.

One example of image processing procedure of the image processing apparatus 10 according to the first embodiment will be described. FIG. 6 is a flowchart illustrating the one example of the image processing procedure of the image processing apparatus 10. FIG. 7 is a diagram illustrating one example of an image 70 including a biological body. The image 70 is obtained by imaging a palm and the following description will be made as one example of an image including a biological body.

The control device 11 of the image processing apparatus 10 acquires an image including a biological body imaged by the imaging device 14 (S101). The control device 11 acquires the image 70, for example.

Figure 8:
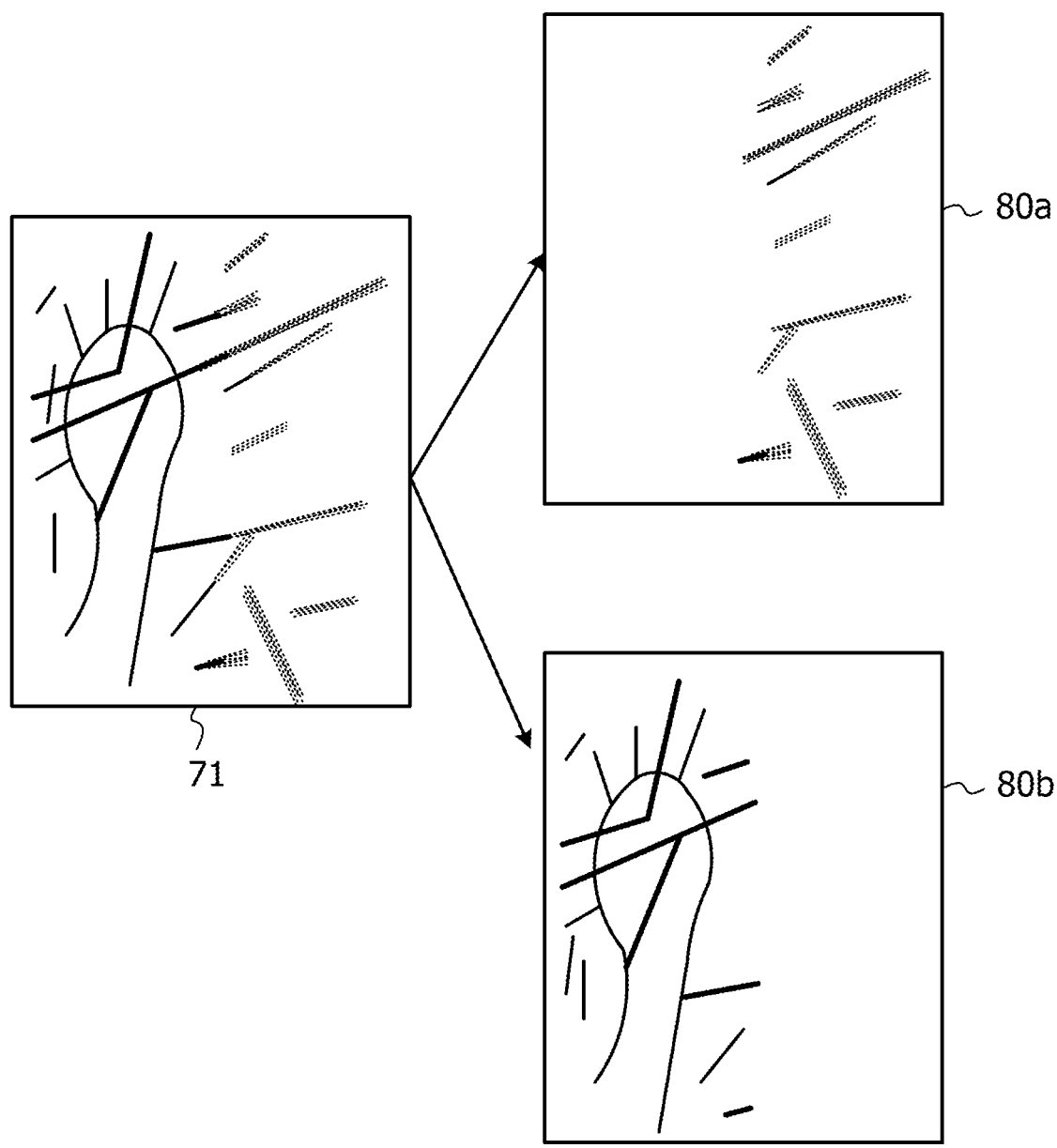
FIG. 8 is a diagram illustrating one example of divided images.

The control device 11 converts the acquired image 70 to a monochrome image 71 (S102). The control device 11 divides the monochrome image 71 into plural regions (S103). FIG. 8 is a diagram illustrating one example of the divided images. For example, the control device 11 divides the monochrome image 71 into right and left images to generate a divided image 80*a* and a divided image 80*b*. The control device 11 may generate the divided image 80*a* and the divided image 80*b* by painting out the right-side or left-side half of the monochrome image 71 by one color such as white, black, or the color of the average of the luminance of the whole of the monochrome image 71. FIG. 8 illustrates the case in which the right-side or left-side half is painted out white as one example.

The control device 11 calculates the spatial frequency characteristic regarding each of the images based on the plural regions arising from the dividing (S104). For example, the control device 11 carries out a fast Fourier transform for each of images for conversion generated by individually burying the divided image 80*a* and the divided image 80*b* in a frame image in which the color by which the half of the monochrome image 71 is painted out is employed as the background color and the numbers of pixels in the vertical and horizontal directions are the same value of a power of two.

As the image for conversion, an image may be used that is obtained by disposing either the divided image 80*a* or the divided image 80*b* at the center of an image of 512×512 pixels in which the average of the luminance values of the respective pixels of the monochrome image 71 is employed as the background color, for example.

The control device 11 calculates the spatial frequency characteristics each corresponding to a respective one of the divided image 80*a* and the divided image 80*b* by the fast Fourier transform. FIG. 9 is a diagram illustrating the result of the fast Fourier transform. The control device 11 may generate a power spectrum image 90*a* and a power spectrum image 90*b* regarding the spatial frequency characteristics each corresponding to a respective one of the divided image 80*a* and the divided image 80*b*.

The control device 11 compares the calculated spatial frequency characteristics (S105). For example, the control device 11 may calculate the difference between the averages of components of frequencies of a part separate from the center by a given distance in the power spectrum image 90*a* and the power spectrum image 90*b*. If the calculated difference is equal to or larger than a threshold, the control device 11 may determine that difference exists between the spatial frequency characteristics each corresponding to a respective one of the divided image 80a and the divided image 80b.

The control device 11 determines the posture of the biological body captured in the monochrome image 71 with respect to the imaging device 14 based on the result of the comparison (S106). For example, if the average of the power spectrum image 90a is smaller by the threshold or larger in the averages of components of frequencies in the region separate from the center by the given distance in the power spectrum image 90a and the power spectrum image 90b, it turns out that the divided image 80a corresponding to the power spectrum image 90a, for example, the right side of the monochrome image 71, has a small amount of high-frequency components and blurs. For example, the control device 11 may determine that the left side of the palm of the subject corresponding to the right side of the monochrome image 71 is located at a shorter distance from the imaging device 14 than the proper imaging distance of the imaging device 14.

Figure 10:
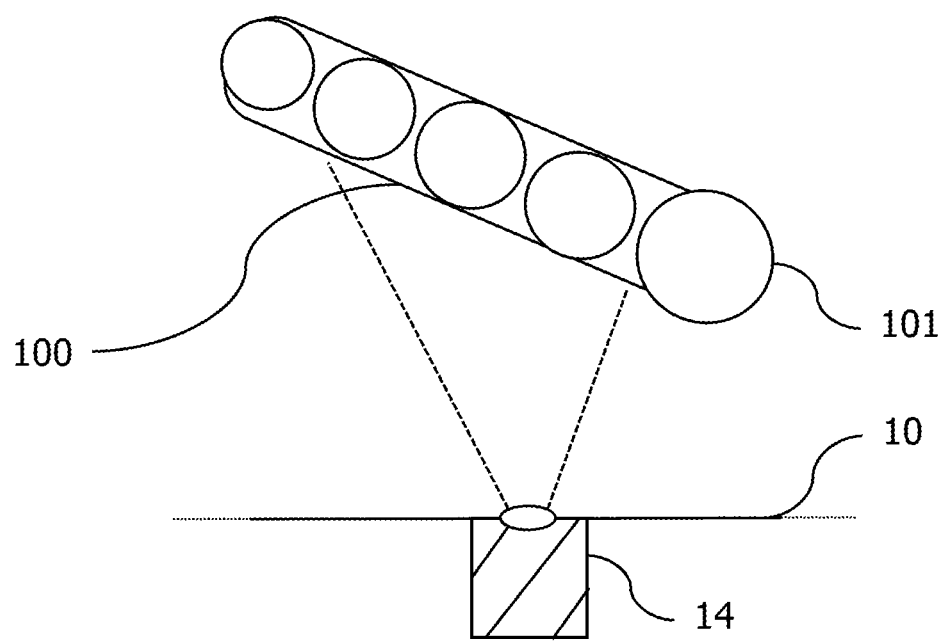
FIG. 10 is a diagram illustrating one example of a posture of a subject.

The control device 11 displays the result of the determination on the display device 13 (S107). FIG. 10 is a diagram illustrating one example of the posture of the subject. The determination result indicates that the side of a thumb 101 of a palm 100 as the subject is closer to the imaging device 14 as illustrated in FIG. 10, for example. The control device 11 may carry out display of contents such as "palm is tilted leftward" and "please make thumb side of palm slightly remoter from camera (in the case of the right hand)."

From the above, the image processing apparatus 10 may determine the posture of the biological body imaged into the image with respect to the imaging device 14 and thus may feed back information on the posture of the subject to the user.

Although the example in which an image is divided in the right-left direction is cited, the configuration is not limited thereto. For example, the control device 11 may divide an image in the upward-downward direction and determine the tilt of the fingertip side and the wrist side of a palm. Moreover, the control device 11 may execute processing based on four divided images of divided images obtained by dividing an image in the right-left direction and divided images obtained by dividing the image in the upward-downward direction.

In this case, the control device 11 may determine the tilt of four parts of right side, left side, fingertip side, and wrist side of a palm based on an acquired image of the palm. For example, if it is determined that the left side and the fingertip side of the palm are closer to the imaging device 14, the control device 11 may carry out display of contents indicating that "left side and fingertip side of palm are lowered."

Subsequently, concrete operation of authentication processing of the control device 11 of the image processing apparatus 10 according to a second embodiment will be exemplified. In the description of the second embodiment, a part similar to a part in the first embodiment is given the same numeral and the description is partly omitted.

The image processing apparatus 10 executes authentication processing that is biometric authentication through reading and execution of an authentication processing program stored in the storing device 12 by the control device 11. As one example, the image processing apparatus 10 carries out matching between an image including a biological body of an authentication target imaged by the imaging device 14 and a registered image registered in a database in advance. For example, if the degree of similarity between a vein pattern included in an image obtained by imaging at the time of authentication processing and a vein pattern registered in the database is equal to or higher than a threshold, the image processing apparatus 10 may determine that the user as the authentication target is the same person as a registered person registered in the database.

Figure 11:
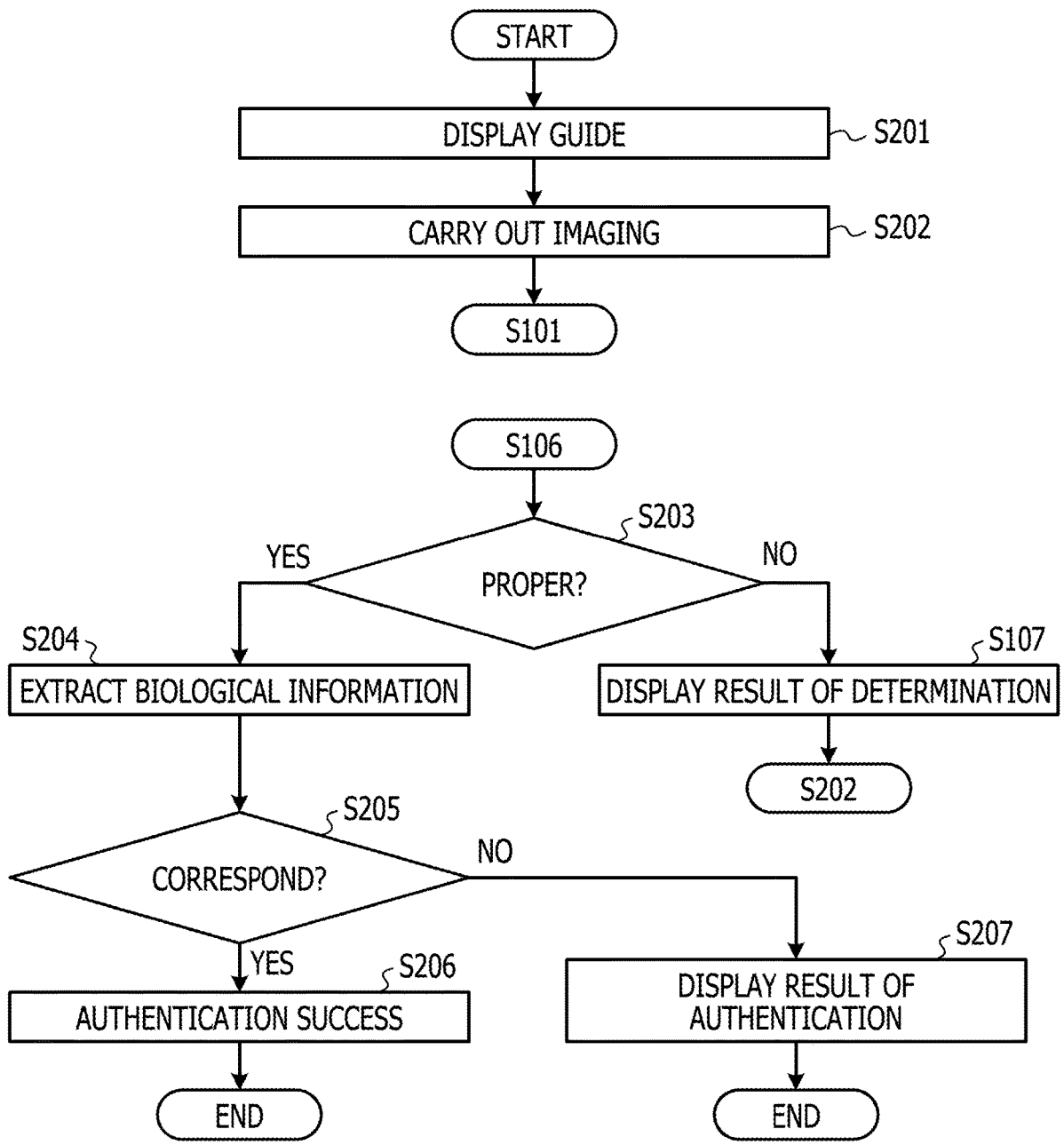
FIG. 11 is a flowchart illustrating one example of authentication processing procedure.

One example of authentication processing procedure of the image processing apparatus 10 according to the second embodiment will be described. FIG. 11 is a flowchart illustrating the one example of the authentication processing procedure of the image processing apparatus 10. S101 to S106 in the authentication processing are similar to the first embodiment and therefore detailed description thereof is omitted.

Figure 12:
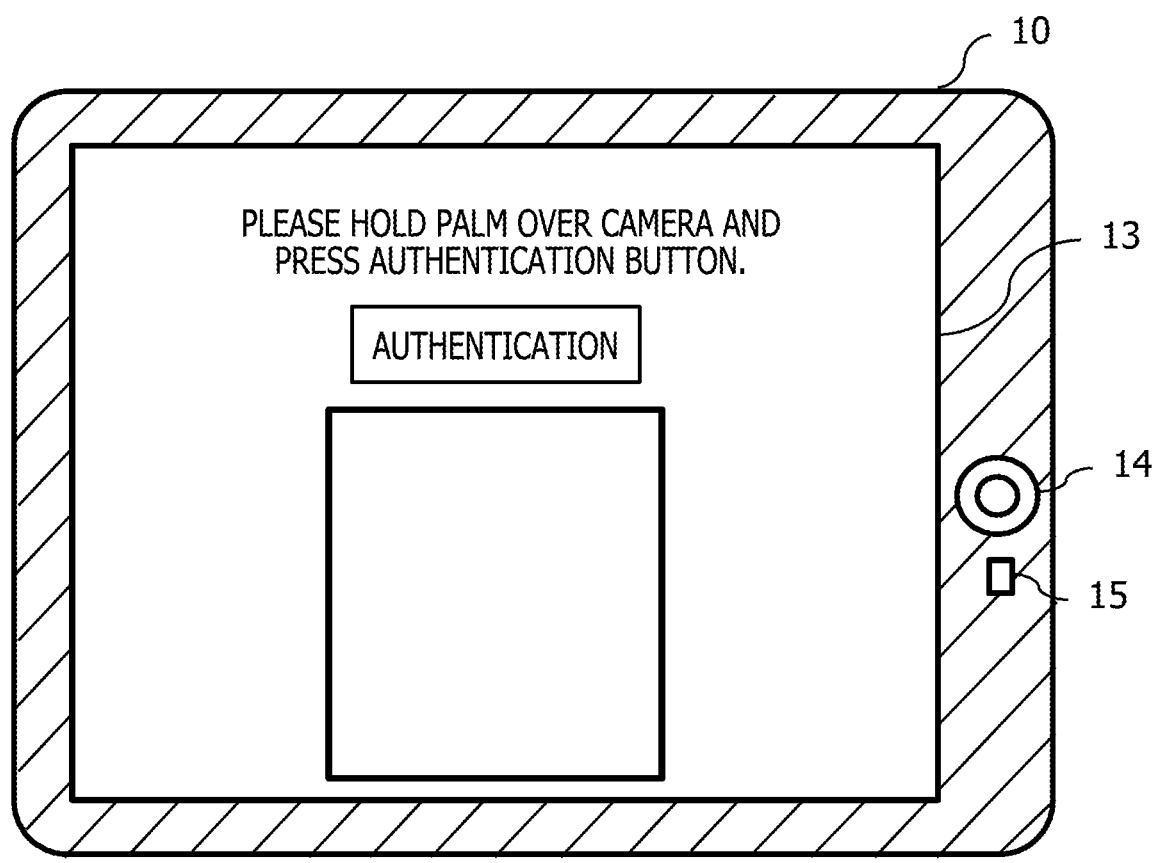
FIG. 12 is a diagram illustrating one example of guide display.

The control device 11 of the image processing apparatus 10 displays a guide to prompt start of authentication on the display device 13 (S201). FIG. 12 is a diagram illustrating one example of the guide display. If the display device 13 is a touch panel, the display device 13 has also functions of the input device 16.

The control device 11 may display a guide for starting authentication like that illustrated in FIG. 12 on the display device 13, for example. When accepting input to start authentication from a user through the display device 13 as the input device 16, the control device 11 carries out imaging by the imaging device 14 (S202). The control device 11 may start imaging when detecting input to an authentication button displayed on the display device 13, for example.

Next, the control device 11 acquires an image including a biological body imaged by the imaging device 14 (S101). The control device 11 converts the acquired image to the monochrome image 71 (S102). The control device 11 divides the monochrome image 71 into plural regions (S103). The control device 11 calculates the spatial frequency characteristic regarding each of images based on the plural regions arising from the dividing (S104). The control device 11 compares the calculated spatial frequency characteristics (S105). The control device 11 determines the posture of the subject captured in the monochrome image 71 with respect to the imaging device 14 based on the result of the comparison (S106).

Next, the control device 11 determines whether the determined posture of the subject is proper for matching (S203). For example, the control device 11 may determine that the posture of the subject is not proper for matching if the posture is tilted with respect to the imaging device 14, and may determine that the posture of the subject is proper for matching if the posture is horizontal or almost horizontal with respect to the imaging device 14.

Figure 13:
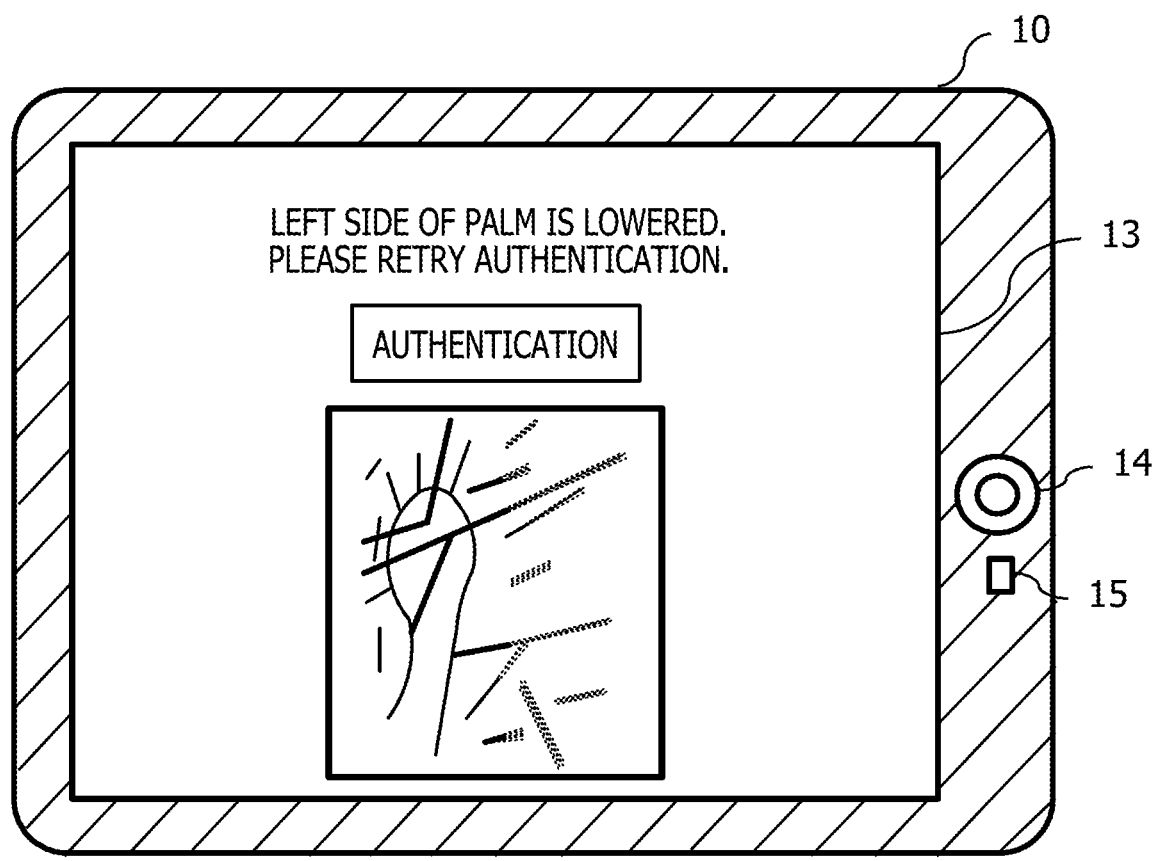
FIG. 13 is a diagram illustrating one example of a determination result.

If it is determined that the posture of the subject is not proper (S203 No), the control device 11 displays the result of the determination on the display device 13 (S107). FIG. 13 is a diagram illustrating one example of the determination result. When accepting input to start authentication from the user again, the control device 11 returns to S202 to repeat the processing.

If it is determined that the posture of the subject is proper (S203 Yes), the control device 11 extracts biological information from the monochrome image 71 generated in S102 (S204). The control device 11 may extract a vein pattern as the biological information, for example. The control device 11 carries out matching between the extracted biological information and registered information registered in the storing device 12 in advance and determines whether the pieces of information correspond (S205). The matching may be one-to-one matching in which matching is carried out only with specific registered information and may be oneto-N matching in which matching with a large number of pieces of registered information is carried out.

If the biological information corresponds (S205 Yes), the control device 11 determines that the user and a registered person are the same person, and regards the authentication of the user as successful to end the authentication processing (S206). If the authentication succeeds, the control device 11 may execute login processing of the user, permission of access to various kinds of data, and so forth.

Figure 14:
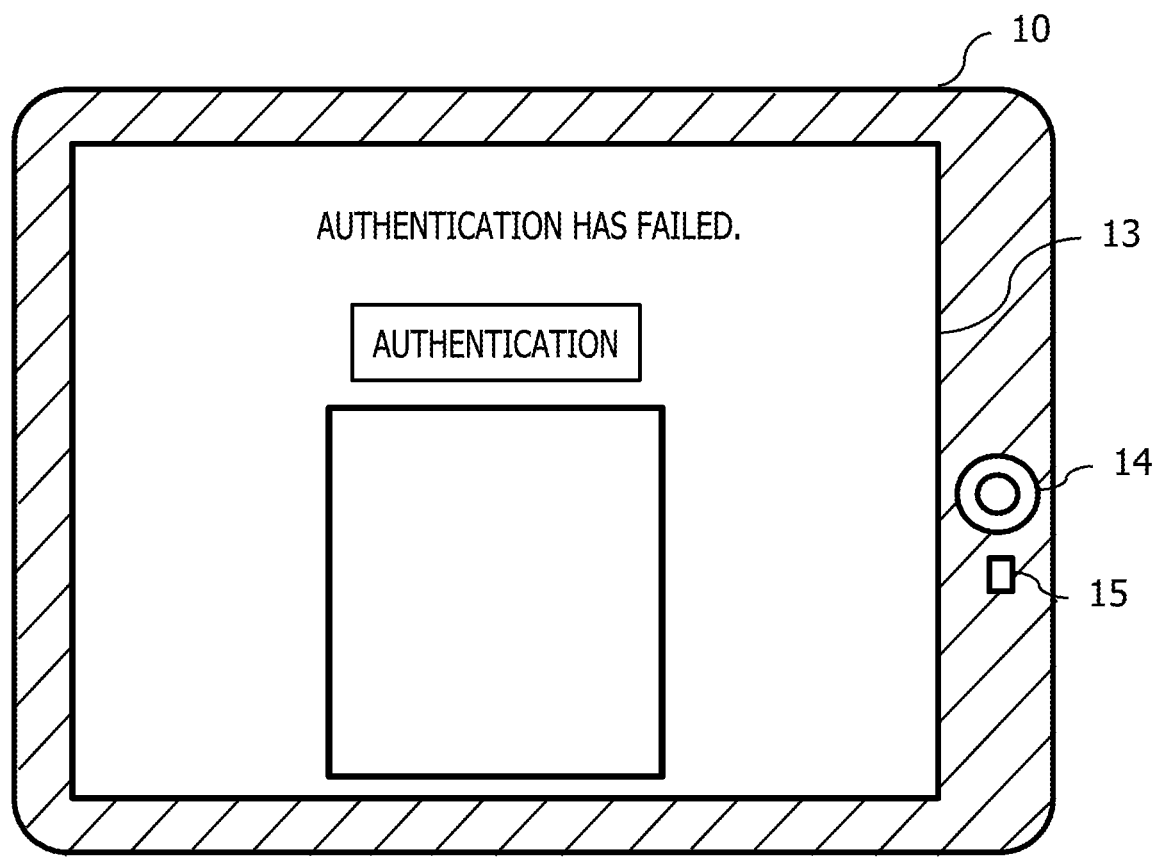
FIG. 14 is a diagram illustrating one example of an authentication result.

If the biological information does not correspond (S205 No), the control device 11 regards the authentication of the user as failed and displays the authentication result on the display device 13 (S207). FIG. 14 is a diagram illustrating one example of the authentication result. For example, the control device 11 may carry out display indicating that the authentication has failed as the authentication result and carry out display that prompts retry of the authentication.

From the above, the image processing apparatus 10 may determine the posture of the biological body imaged into the image with respect to the imaging device 14 and thus may feed back information on the posture to the user. For example, the tilt of a palm is pointed out, which allows the user to adjust the posture of the hand to posture suitable for imaging. If the posture of the subject with respect to the imaging device 14 is proper, the image processing apparatus 10 carries out matching with use of the image with which the posture has been determined and executes authentication processing. Thus, the image processing apparatus 10 executes the matching processing only with the image suitable for the matching.

Moreover, although the image processing apparatus 10 is described as a stand-alone terminal, the configuration is not limited thereto. For example, the image processing apparatus 10 may be coupled to an external server apparatus through a network. In this case, part of the processing described in the respective embodiments may be executed in the server apparatus.

As one example, a modification example of the second embodiment will be described. The procedure to S106 in authentication processing of the modification example is the same as the above-described procedure and therefore description thereof is omitted. If it is determined that the posture of the subject is proper (S203 Yes), the image processing apparatus 10 transmits the monochrome image 71 generated in S102 to a server apparatus. In the server apparatus, similar processing to the processing of S204 and S205 is executed. The image processing apparatus 10 receives the result of the processing in the server apparatus and executes processing of S206 or S207 based on the result. As in the modification example, each embodiment may be applied also to a client-server system and the processing load may be balanced based on the client-server system.

The present disclosure is not limited to the configurations and procedures of the above-described respective embodiments and change, rearrangement, and so forth of the processing method may be carried out as appropriate without departing from the gist of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a memory; and
a processor coupled to the memory and the processor configured to
acquire an image in which a subject is captured by a camera,
calculate a plurality of spatial frequency characteristics on the basis of each of a plurality of regions included in the image, and
perform determination of a tilt of the subject with respect to the camera in accordance with the plurality of spatial frequency characteristics,
wherein the determination includes
comparing the plurality of spatial frequency characteristics with each other, and
when difference regarding components of spatial frequencies in a specific range included in the plurality of spatial frequency characteristics is no less than a threshold, determining that a first part of the subject corresponding to a first region of the image is closer to the imaging device than another part of the subject, an amount of components of the special frequencies in the specific range included in a spatial frequency characteristic based on the specific region being smaller in the plurality of regions.

2. The image processing apparatus according to claim 1, wherein
the processor is further configured to, when it is determined that the determined tilt of the subject is appropriate, compare the image with a registered image stored in the memory to determine whether the subject of the image matches a subject of the registered image.

3. The image processing apparatus according to claim 2, wherein
the subject is a palm.

4. The image processing apparatus according to claim 3, wherein
the plurality of regions includes at least one of a right-side region of the image, a left-side region of the image, an upper-side region of the image, or a lower-side region of the image.

5. The image processing apparatus according to claim 1, wherein
the difference is difference between averages of the components of the spatial frequencies in the specific range included in the plurality of spatial frequency characteristics.

6. The image processing apparatus according to claim 5, wherein
the averages is calculated by using components included in the specific range having a given distance from a center in each of power spectrum images when each of the plurality of spatial frequency characteristics is expressed as each of the power spectrum images in which a lower-frequency component is disposed at a position closer to the center and a higher-frequency component is disposed at a position closer to periphery.

7. An image processing method comprising:
acquiring an image in which a subject is captured by a camera;
calculating a plurality of spatial frequency characteristics on the basis of each of a plurality of regions included in the image; and determining a tilt of the subject with respect to the camera in accordance with the plurality of spatial frequency characteristics, wherein the determining includes comparing the plurality of spatial frequency characteristics with each other, and when difference regarding components of spatial frequencies in a specific range included in the plurality of spatial frequency characteristics is no less than a threshold, determining that a first part of the subject corresponding to a first region of the image is closer to the imaging device than another part of the subject, an amount of components of the special frequencies in the specific range included in a spatial frequency characteristic based on the specific region being smaller in the plurality of regions.

8. The image processing method according to claim 7, further comprising: when it is determined that the determined tilt of the subject is appropriate, comparing the image with a registered image stored in a memory to determine whether the subject of the image matches a subject of the registered image.

9. The image processing method according to claim 7, wherein the subject is a palm.

10. The image processing method according to claim 7, wherein the plurality of regions includes at least one of a right-side region of the image, a left-side region of the image, an upper-side region of the image, or a lower-side region of the image.

11. The image processing method according to claim 7, wherein the difference is difference between averages of the components of the spatial frequencies in the specific range included in the plurality of spatial frequency characteristics.

12. The image processing method according to claim 11, wherein the averages is calculated by using components included in the specific range having a given distance from a center in each of power spectrum images when each of the plurality of spatial frequency characteristics is expressed as each of the power spectrum images in which a lower-frequency component is disposed at a position closer to the center and a higher-frequency component is disposed at a position closer to periphery.

13. A non-transitory computer-readable medium storing an image processing program that causes a computer to execute a process comprising:

acquiring an image in which a subject is captured by a camera;

calculating a plurality of spatial frequency characteristics on the basis of each of a plurality of regions included in the image; and determining a tilt of the subject with respect to the camera in accordance with the plurality of spatial frequency characteristics, wherein the determining includes comparing the plurality of spatial frequency characteristics with each other, and when difference recording components of spatial frequencies in a specific range included in the plurality of spatial frequency characteristics is no less than a threshold, determining that a first part of the subject corresponding to a first region of the image is closer to the imaging device than another part of the subject, an amount of components of the special frequencies in the specific range included in a spatial frequency characteristic based on the specific region being smaller in the plurality of regions.

\* \* \* \* \*